US012632606B1

(12) United States Patent
Kinzel et al.

(10) Patent No.: US 12,632,606 B1
(45) Date of Patent: May 19, 2026

(54) VERIFICATION OF COMPUTER-GENERATED MATERIAL

(71) Applicant: Advanced CFD Solutions, LLC, Oviedo, FL (US)

(72) Inventors: Michael Kinzel, Oviedo, FL (US); Marta Reviriego-Mendoza, Oviedo, FL (US)

(73) Assignee: Advanced CFD Solutions, LLC, Oviedo, FL (US)

( * ) Notice: Subject to any disclaimer, the term of this patent is extended or adjusted under 35 U.S.C. 154(b) by 0 days.

(21) Appl. No.: 19/188,970

(22) Filed: Apr. 24, 2025

(51) Int. Cl.
| | |
|---|---|
| *G06F 21/64* | (2013.01) |
| *G06F 40/117* | (2020.01) |
| *G06F 40/126* | (2020.01) |
| *H04L 9/32* | (2006.01) |

(52) U.S. Cl.
CPC ............ *G06F 21/64* (2013.01); *G06F 40/117* (2020.01); *G06F 40/126* (2020.01); *H04L 9/32* (2013.01)

(58) Field of Classification Search
None
See application file for complete search history.

(56) References Cited

U.S. PATENT DOCUMENTS

| | | | | |
|---|---|---|---|---|
| 2001/0046307 A1* | 11/2001 | Wong | ................. | H04N 1/32283 |
| | | | | 382/100 |
| 2003/0105950 A1* | 6/2003 | Hirano | ................ | G06F 21/6218 |
| | | | | 713/100 |

| | | | | |
|---|---|---|---|---|
| 2004/0194027 A1* | 9/2004 | Suzuki | .................. | G06F 40/117 |
| | | | | 380/278 |
| 2011/0145582 A1* | 6/2011 | Han | .................... | H04N 1/32144 |
| | | | | 713/176 |
| 2012/0155634 A1* | 6/2012 | Baughman | ............... | G09C 5/00 |
| | | | | 380/28 |
| 2013/0097421 A1* | 4/2013 | Lim | .......................... | H04L 9/00 |
| | | | | 713/167 |
| 2015/0146984 A1* | 5/2015 | Brown | ................... | G06V 30/40 |
| | | | | 382/182 |
| 2020/0293605 A1* | 9/2020 | Nelson | .................. | G06N 20/00 |
| 2020/0293606 A1* | 9/2020 | Nelson | ................. | G06F 40/117 |
| 2021/0109919 A1* | 4/2021 | Raj | ......................... | G06F 16/27 |
| 2021/0218719 A1* | 7/2021 | Manasse | .............. | H04L 9/0891 |
| 2024/0370660 A1* | 11/2024 | Cha | .......................... | G06T 11/00 |
| 2024/0420496 A1* | 12/2024 | Wang | .................. | G06V 30/412 |
| 2025/0005691 A1* | 1/2025 | Lipka | ..................... | G06Q 50/18 |

FOREIGN PATENT DOCUMENTS

| | | | | | | |
|---|---|---|---|---|---|---|
| CN | 103034971 A | * | 4/2013 | | | |
| CN | 112836184 A | * | 5/2021 | ............. | G06F 21/10 |
| CN | 116762071 A | * | 9/2023 | ......... | G06F 16/9035 |
| CN | 117235785 A | * | 12/2023 | | |
| JP | 2003134327 A | * | 5/2003 | | |
| JP | 2003264685 A | * | 9/2003 | ........... | H04L 9/0861 |
| KR | 20030083273 A | * | 10/2003 | ......... | G06F 21/6209 |
| WO | WO-2024112599 A1 | * | 5/2024 | ......... | G06F 21/6209 |

* cited by examiner

*Primary Examiner* — Ali H. Cheema
(74) *Attorney, Agent, or Firm* — Dickinson Wright PLLC

(57) ABSTRACT

A computer architecture for using encoded embedded information in a document is disclosed. A computer system may generate a document based on at least one piece of initial information, and encode the embedded information within the document. In response to receiving one or more keys from a user, where the keys are derived by the user from the embedded information encoded in the document, the computer system may release the document to a particular application.

17 Claims, 10 Drawing Sheets

VERIFICATION OF COMPUTER-GENERATED MATERIAL

TECHNICAL FIELD

This disclosure relates generally to computer-generated documents, media, and data. More specifically, this disclosure relates to a system and method for verifying computer-generated documents and data using information encoded in the computer-generated documents.

BACKGROUND

Improvements in computer hardware technology have provided a platform for generating increasingly sophisticated artificial-intelligence applications that can mimic certain aspect of human intelligence. Such applications can be implemented using machine-learning techniques that allow an artificial-intelligence program to automatically improve its performance on a particular task. Machine learning can be unsupervised where a stream of data is analyzed with no guidance, or be supervised where training data is labeled with expected answers before the training data is analyzed.

The use of natural language processing (NLP) has allowed artificial-intelligence applications to read, write, and communicate in human languages. With such abilities, artificial-intelligence applications can more easily communicate with humans through speech recognition and synthesis. Media, data, designs, etc., can be generated by a computer system using similar models.

SUMMARY

Various embodiments of an architecture for encoding information into a document are disclosed. Broadly speaking, a computer system may generate a document based on at least one piece of initial information, and encode embedded information into the document. The computer system may also, in response to receiving one or more keys from a user, release the document to a particular application. The one or more keys may, in certain embodiments, be derived from the embedded information encoded in the document by the computer system.

In some embodiments, the computer system may generate the document using at least one machine-learning model and based on the at least one piece of initial information. In other embodiments, encoding the embedded information into the document includes inserting one or more portions of the embedded information into one or more random locations of a plurality of random locations in the document.

In various embodiments, the computer system may, in response to verifying the one or more keys received from the user, remove the embedded information from the document. In other embodiments, the computer system may generate, using the at least one portion of the document, the embedded information. In some embodiments, to generate the embedded information, the computer system may determine a random value using the at least one portion of the document.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as read only memory (ROM), random access memory (RAM), a hard disk drive, a compact disc (CD), a digital video disc (DVD), solid state drives (SSDs), flash, or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many, if not most, instances, such definitions apply to prior as well as future uses of such defined words and phrases.

It should be noted that the term "cellular media access control (MAC) address" may refer to a MAC, international mobile subscriber identity (IMSI), mobile station international subscriber directory number (MSISDN), enhanced network selection (ENS), or any other form of unique identifying number.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
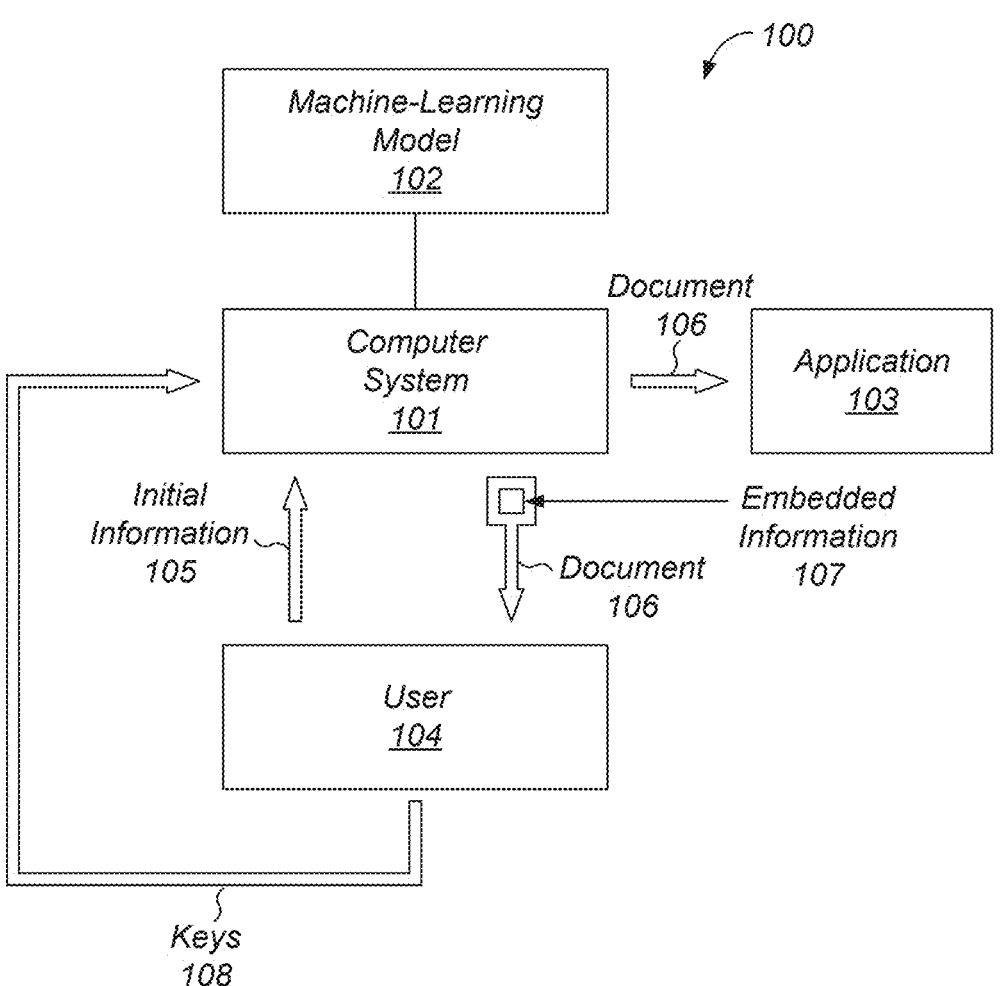
FIG. 1 depicts a block diagram of a system architecture for verifying computer-generated documents.

Advances in computer hardware have made possible the widespread use of artificial-intelligence techniques. Such techniques can allow computers to perform tasks typically associated with human intelligence such as learning, problem-solving, reasoning, and the like. For example, artificial-intelligence techniques can be applied to web search engines and virtual assistants, autonomous vehicle operations, and numerous other applications.

Artificial intelligence is also becoming increasingly prevalent in the areas of creative and generative computer tools. Once such tools are trained, they can generate documents and images based on an initial input provided by a user. As used herein, a user may refer to a person, another computer system, an artificial-intelligence engine, or any other suitable entity capable of generating a prompt for a tool. For example, tools like ChatGPT can, based on a prompt from a user, write and debug computer programs, compose music, compose written works (e.g., stories, poems, screenplays, essays, etc.), answer questions, and the like.

One challenge with using generative artificial-intelligence tools is hallucinations that can result in an output from a generative tool containing false or misleading information. Hallucinations can result from inaccuracies in training data. Moreover, generative artificial-intelligence tools are designed to generate plausible content, i.e., predicate a next word in a story, poem, etc., rather than to verify the truth of what is being generated.

Another challenge presented by generative artificial-intelligence tools results from peoples' attempts to use computer-generated content in fraudulent manners. In some cases, a person may present a computer-generated work as the person's own work. For example, a student could use a generative artificial-intelligence tool to write an essay rather than actually writing the essay. In other cases, generative artificial-intelligence tools can be used to create audio or video data representing a particular person (referred to as a "deepfake") for blackmail purposes or to influence an unsuspecting individual to reveal personal or financial information.

The embodiments illustrated in the drawings and described below provide techniques for detecting computer-generated documents and verifying the contents of such documents. By searching for embedded information included in a computer-generated document, different levels of review can be imposed on a user to check for errors, hallucinations, and the like in the computer-generated document. Moreover, embedded information included in a document can be used by a person or another computer system to detect that the document was generated by a computer. Such detection can be used to alert the person or computer system that the document being viewed may be computer generated.

A block diagram of an embodiment of a system architecture for verifying computer-generated documents is depicted in FIG. 1. As illustrated, system architecture 100 includes computer system 101, machine-learning model 102, application 103, and user 104.

Computer system 101 is configured to generate document 106 based on initial information 105 received from user 104. As used herein, document refers to text data, image data, audio data, video data, or any other computer data. In different embodiments, user 104 may be part of a company or organization, e.g., a student at a school or university, which employs computer system 101. For example, computer system 101 may be employed by a school to allow students, including user 104, to receive and submit homework or other assignments. In various embodiments, initial information 105 may include a brief description of the type of document to be generated in response to a query from an artificial-intelligence engine or application being executed by computer system 101 using machine-learning model 102. For example, in response to a query from computer system 101, user 104 could respond with the following: "Write a story about a dog and a cat who are friends."

Computer system 101 can be further configured to encode embedded information 107 into document 106. In various embodiments, embedded information 107 may include a string of random characters, a code or key that includes an alphanumeric string, or any other suitable type of embedded information. Alternatively, or additionally, embedded information 107 may include data that matches the context of document 106. For example, in a text document, embedded information 107 may include a sentence that contains erroneous or irrelevant information that user 104 can identify as having been added to document 106. In some embodiments, embedded information 107 may be based on a unique identifier associated with user 104. Alternatively, or additionally, embedded information 107 may be based on a portion of document 106. For example, a portion of text from document 106 may be used as a seed to generate random values to be used as part of embedded information 107.

In some embodiments, to encode embedded information 107 into document 106, computer system 101 may be further configured to insert one or more portions of embedded information 107 into one or more random locations of a plurality of random locations within document 106. In various embodiments, the one or more random locations are unknown to user 104. In some cases, a number of locations may be programmable or set by a configuration file used by computer system 101 and configured for insertion of one or more portions of embedded information 107. By using multiple random locations, different levels of review strength may be imposed on user 104 by computer system 101. Computer system 101 may be configured to impose different levels of review on configuration settings, characteristics of machine-learning model 102, or any other suitable setting. For example, computer system 101 may impose a lowest level of review by including a single portion of embedded information 107 in document 106. Alternatively, computer system 101 may impose a higher level of review by including multiple portions of embedded information 107 in a set of corresponding random locations in document 106, forcing user 104 to identify all of the portions of embedded information 107 before document 106 can be released to 103.

Additionally, computer system 101 is further configured to release document 106 to application 103 in response to receiving keys 108 from user 104 signaling user 104 has reviewed the document 106 and is satisfied with document 106. In various embodiments, keys 108 can be derived by user 104 from embedded information 107. In various embodiments, document 106 remains in a state where it is unusable by application 103 until document 106 is released by computer system 101. In some cases, computer system 101 may encrypt document 106 so that it is unusable by application 103, and then decrypt document 106 when keys 108 are received.

In some cases, embedded information 107 may include keys 108. In reviewing document 106, user 104 can then retrieve keys 108 from document 106 and send keys 108 to computer system 101. Alternatively, embedded information 107 may be used by user 104 to derive keys 108. For example, embedded information 107 may be entered into a verification application on user equipment associated with user 104. Such a verification application can generate keys 108 using embedded information 107.

Application 103 may, in some embodiments, correspond to a software application being executed on computer system 101 or any other suitable computer system coupled to computer system 101 via a network connection. In various embodiments, application 103 may be any suitable application that processes, attaches, or otherwise consumes document 106. For example, application 103 may be an e-mail program, a website interface, a software program being executed on computer system 101 or any other suitable computer system, an app, an artificial-intelligence engine included in computer system 101 or any other suitable computer system, and the like.

Figure 2:
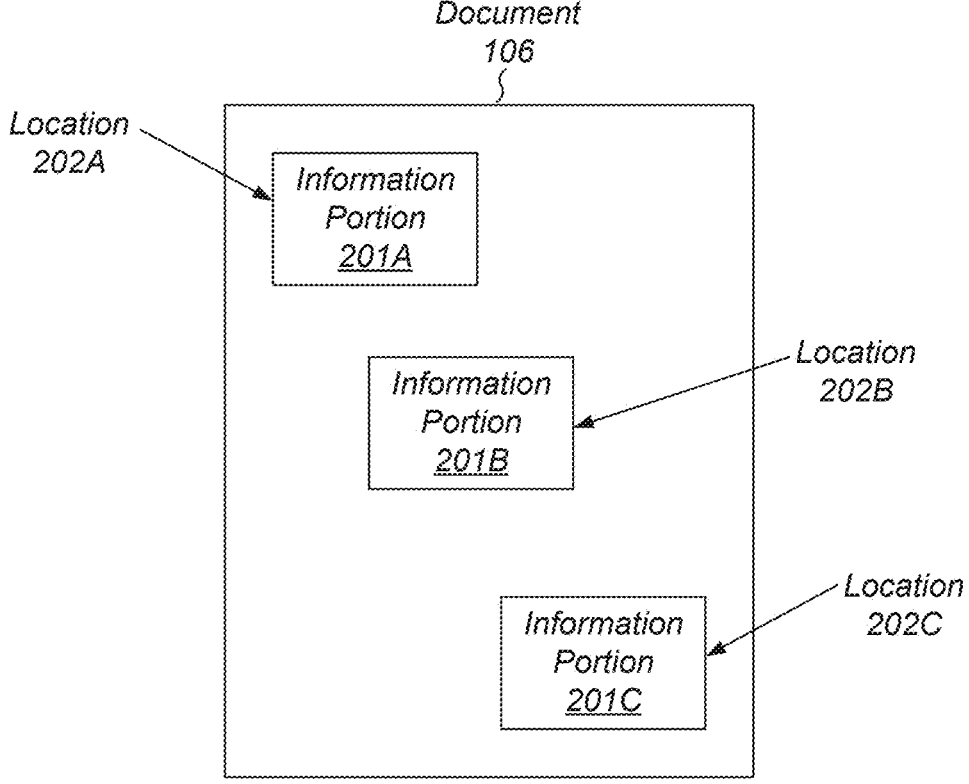
FIG. 2 depicts a block diagram of an embodiment of a document that includes embedded information.

Turning to FIG. 2, a block diagram of an embodiment of document 106 is depicted. As illustrated, document 106 includes information portions 201A-201C. In various embodiments, information portions 201A-201C are included in embedded information 107.

In various embodiments, information portion 201A is located in document 106 at location 202A. In a similar fashion, information portion 201B and information portion 201C are located in document 106 at locations 202B and 202C, respectively.

In various embodiments, the number of information portions included in embedded information 107 may be adjustable, and may be based on a level of review to impose on user 104. More information portions can correspond to a higher level of review as more than one of the portions may be used to derive keys 108.

Computer system 101 may be configured to select locations 202A-202C at random. In some embodiments, a particular portion of document 106 may be used as a seed to generate one or more random numbers. It is noted that, in some cases, information portions 201A-201C may be encoded into document 106 using text steganography. For example, information portion 201A may be encoded into document 106 by the inclusion of one or more additional sentences not originally part of the document. User 104 may detect such sentences via contextual clues, grammatical errors, or other suitable types of identifiers.

Figure 3:
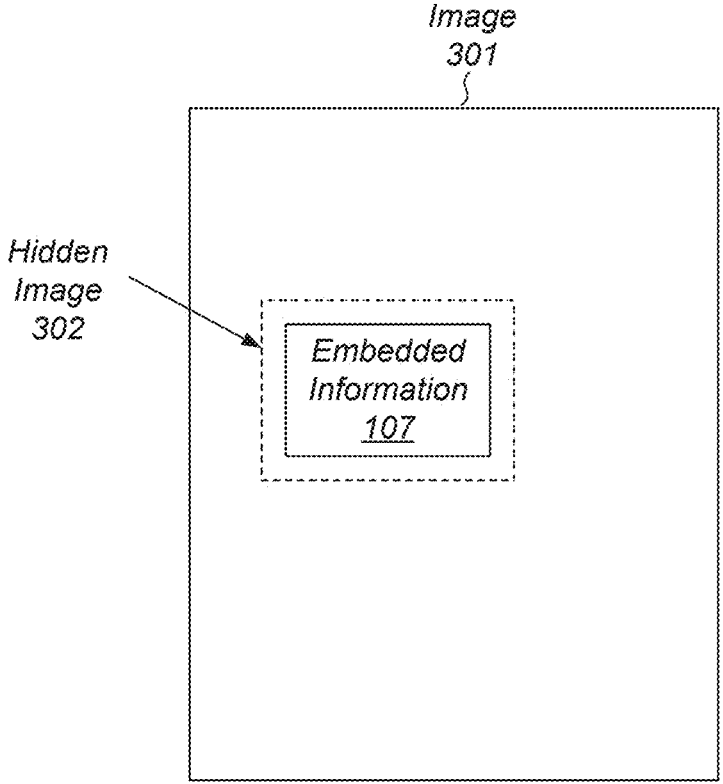
FIG. 3 depicts a block diagram of an embodiment of an image that includes embedded information.

Although computer system 101 has been described as generating documents, in other embodiments, computer system 101 may additionally be configured to generate image files. FIG. 3 depicts an embodiment of an image generated by computer system 101.

As illustrated, computer system 101 is configured to generate image 301 to include embedded information 107. As with document 106, image 301 may be generated in response to receiving initial information 105 from user 104. For example, computer system 101 may prompt user 104 and, in response to the prompt, user 104 may suggest a topic for image 301.

In some embodiments, embedded information 107 may be included as part of hidden image 302 that is included in image 301. In various embodiments, hidden image 302 may be a small image that can be detected under high magnification. Alternatively, or additionally, hidden image 302 may be hidden using steganography or any other suitable algorithm. Steganography can also be employed to encode embedded information 107 into document 106.

In some embodiments, before image 301 can be released to application 103, user 104 may derive keys 108 from embedded information 107 in image 301. In some cases, user 104 may employ an application or program that extracts hidden image 302 from image 301 in order to retrieve embedded information 107. In some embodiments, hidden image 302 may include a visual depiction of keys 108, or other information that can be used to derive keys 108.

Figure 4:
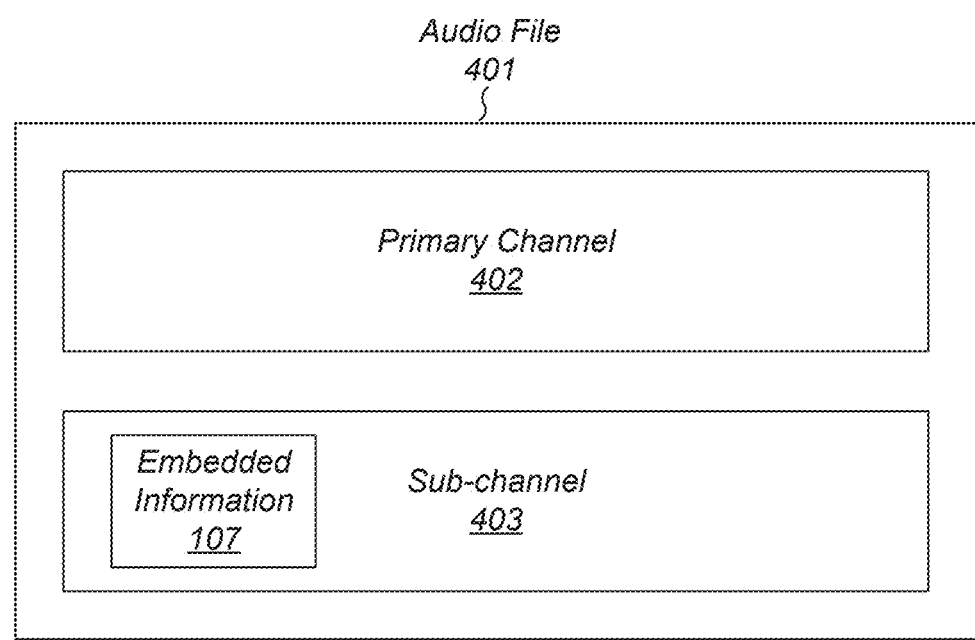
FIG. 4 depicts a block diagram of an embodiment of an audio file that includes embedded information.

In addition to documents and images, computer system 101 may also be configured to generate audio files. An example of a computer generated audio file is depicted in FIG. 4. As with document 106 and image 301, audio file 401 may be generated by computer system 101 based on received initial information, e.g., initial information 105.

As illustrated, audio file 401 includes primary channel 402 and sub-channel 403. In some embodiments, embedded information 107 is included in sub-channel 403. In various embodiments, embedded information 107 may take the form of a series of tones that encode embedded information 107. For example, certain tones may correspond to certain alpha or numeric values. By isolating sub-channel 403 when listening to audio file 401, the encoded information can be retrieved in order to generate keys 108.

Alternatively, or additionally, embedded information 107 may be encoded into primary channel 402 using audio steganography or any other suitable algorithm. Although only a single instance of embedded information 107 is depicted in the embodiment of FIG. 4, in other embodiments, embedded information 107 may be split into multiple portions that are encoded at different points in audio file 401.

Figure 5:
FIG. 5 depicts a block diagram of an embodiment of a system architecture.
Figure 5:
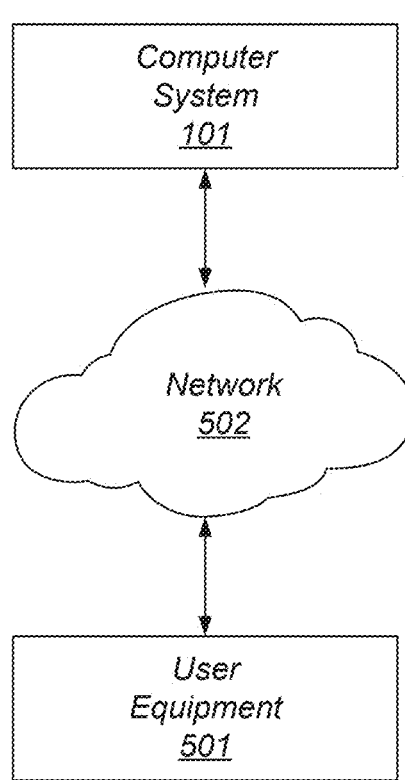

Turning to FIG. 5, a block diagram of an embodiment of a system architecture is depicted. As illustrated, system architecture 500 includes computer system 101 and user equipment 501. In various embodiments, system architecture 500 may be used to implement the hardware portion of system architecture 100 as depicted in FIG. 1.

Computer system 101 is coupled to network 502, and is configured to send and receive data via network 502. In various embodiments, network 502 may be either a wired or a wireless network and may employ one of various networking standards such as Ethernet (802.3), Gigabit Ethernet, 10-Gigabit Ethernet, and the like.

User equipment 501 is also coupled to network 502 and is configured to send and receive data, e.g., document 106 and/or initial information 105, via network 502. In various embodiments, user equipment 501 may be implemented as a desktop computer, laptop computer, tablet, handheld computer (e.g., smartphone), or any other suitable type of computer system.

Figure 6:
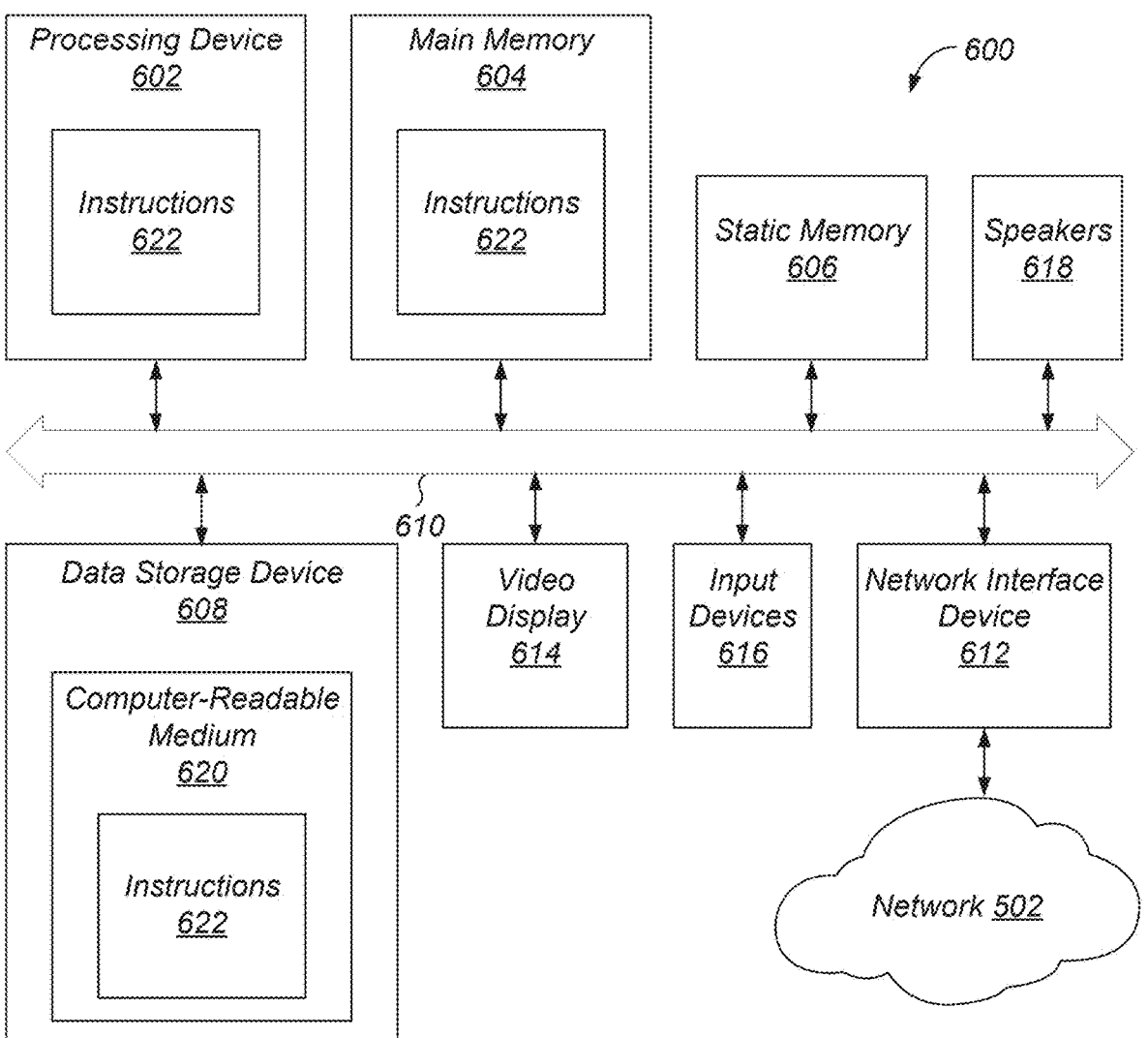
FIG. 6 depicts a block diagram of an embodiment of a computer system.

Turning to FIG. 6, a block diagram of a computer system is depicted. As illustrated, computer system 600 includes processing device 602, main memory 604, static memory 606, data storage device 608, video display 614, input devices 616, speakers 618, and network interface device 612. In various embodiments, computer system 600 may correspond to computer system 101 as depicted in FIGS. 1 and 5.

Processing device 602 may be implemented using one or more general-purpose processing devices such as a micro-processor, central processing unit, or the like. M ore particularly, processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also be one or more special-purpose processing devices such as an application specific integrated circuit (A SIC), a field programmable gate array (FPGA), a digital signal processor (DSP), a network processor, or the like. Processing device 602 is configured to execute instructions 622 for performing any of the operations and steps discussed herein.

Computer system 600 may further include a network interface device 612 configured to send and receive information via network 502. Additionally, computer system 600 also may include video display 614 (e.g., a liquid crystal display (LCD), a cathode ray tube (CRT), or the like), input devices 616 (e.g., a keyboard, a mouse, a virtual or aug-mented reality device, etc.), and one or more speakers 618. In one illustrative example, video display 614 and input devices 616 may be combined into a single component or device (e.g., an LCD touch screen).

Main memory 604 is configured to store instructions 622, which can be retrieved by processing device 602, via bus 610, for execution. In various embodiments, main memory 604 may be implemented using read-only memory (ROM) circuits, flash memory circuits, dynamic random-access memory (DRA M) circuits, static random-access memory (SRAM) circuits, or any other suitable memory circuits.

Static memory 606 may be implemented using one or more SRAM memory circuits. Although only a single static memory is depicted in the embodiment of FIG. 6, in other embodiments, multiple static memories of varying sizes may be used to implement a hierarchy of cache memory circuits for both data and instructions. In various embodiments, static memory 606 is configured to communicate, via bus 610, with the other elements included in computer system 600.

Data storage device 608 includes computer-readable stor-age medium 620, and is configured to store instructions 622 and communicate with the other elements included in com-puter system 600. In various embodiments, data storage device 608 is configured to communicate with each other via bus 610. In some embodiments, data storage device 608 may be implemented using one or more rack-mounted storage devices.

Computer-readable storage medium 620 may be imple-mented using a hard-disc drive, CD-drive, tape drive, mul-tiple flash memory circuits arranged as a solid-state drive (SSD), or any other suitable type of computer-readable storage medium. While computer-readable storage medium 620 is shown in the illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Computer system 600 can perform any one or more of the methods described herein, in accordance with one or more aspects of the present disclosure. In one example, computer system 600 may correspond to computer system 101 of FIG. 1. Alternatively, or additionally, computer system 600 may correspond to user equipment 501 of FIG. 5, server 701 of FIG. 7, or computer system 801 of FIG. 8. Computer system 600 may be connected (e.g., networked) to other computer systems in a LAN, an intranet, an extranet, or the Internet. Computer system 600 may operate in the capacity of a server in a client-server network environment. In various embodi-ments, computer system 600 may be implemented as a personal computer (PC), a tablet computer, a wearable device (e.g., a watch or wristband), a set-top box (STB), a personal Digital Assistant (PDA), a mobile phone, a camera, a video camera, an electronic device identification sensor, a quantum computer, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

Figure 7:
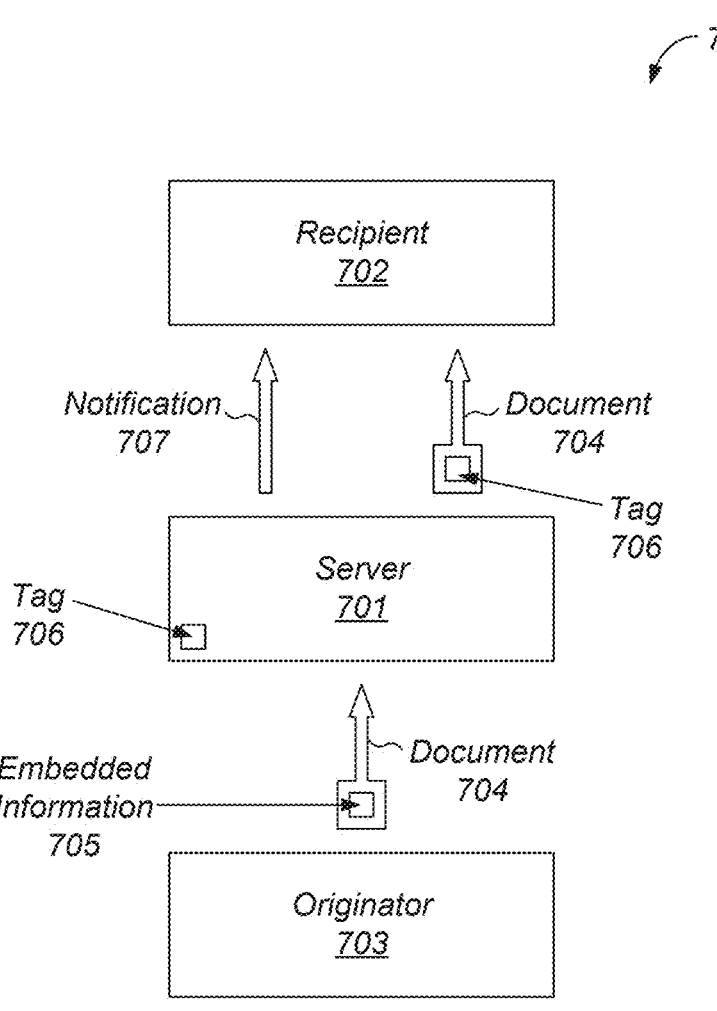
FIG. 7 depicts a block diagram of an embodiment of a system architecture that includes a verification server.

Turning to FIG. 7, a block diagram of an embodiment of a system architecture that includes a verification server is depicted. As illustrated, system architecture 700 includes server 701, recipient 702, and originator 703.

Server 701 is configured to receive document 704 from originator 703. In various embodiments, document 704 may be received via network 502 or any other suitable network coupled between user equipment of originator 703 and server 701.

In various embodiments, document 704 may be computer generated and include embedded information 705. As described above, the inclusion of embedded information 705 can be indicative of the fact that document 704 is computer generated. Document 704 may be a text file, word process-ing file, image file, audio file, video file, or any other file type that can be generated by a computer using a machine-learning model.

Server 701 is further configured to check document 704 for embedded information. In response to a determination that document 704 includes embedded information 705, server 701 is further configured to generate tag 706 noting that document 704 is computer generated. In some embodi-ments, server 701 is further configured to add tag 706 to document 704, and forward document 704 to recipient 702.

In other embodiments, server 701 is configured to send notification 707 to recipient 702 and halt delivery of docu-ment 704. In such cases, notification 707 may include a message to recipient 702 informing recipient 702 that docu-ment 704 is computer generated. In various embodiments, notification 707 may additionally include instructions to allow recipient 702 to retrieve document 704 from server 701.

Figure 8:
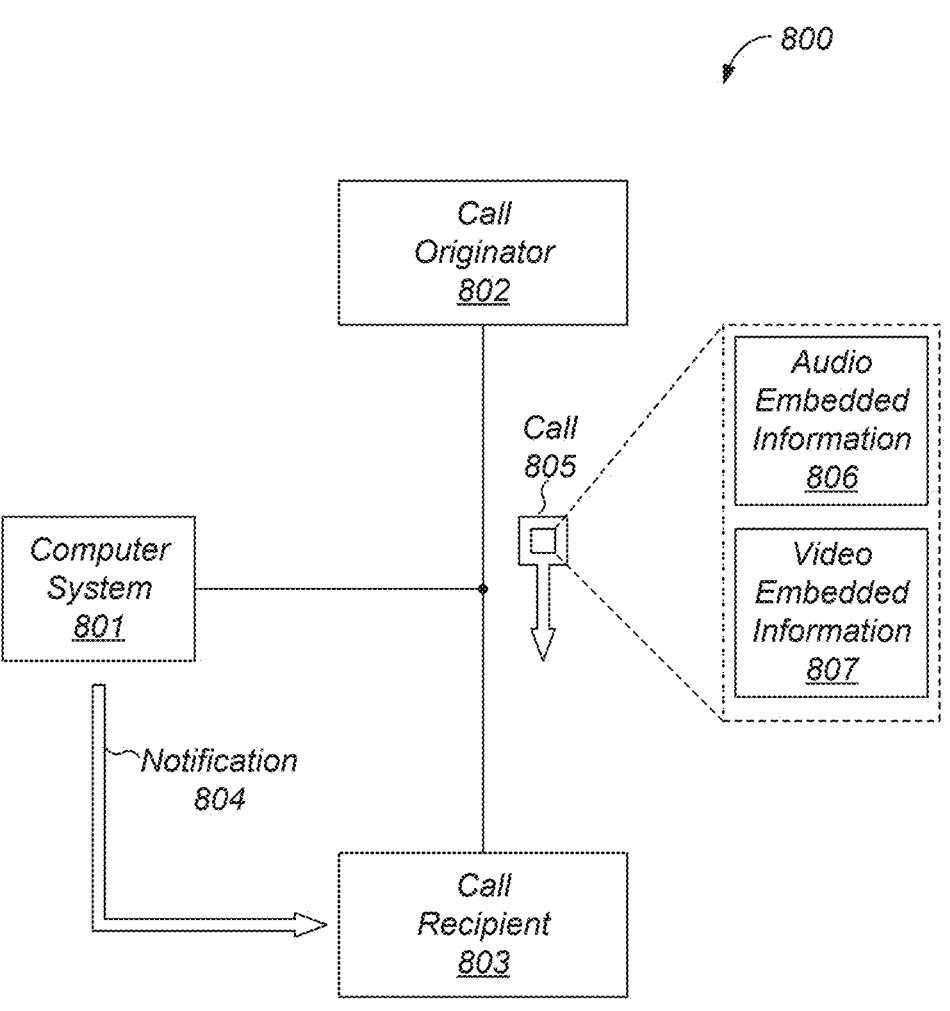
FIG. 8 depicts a block diagram of an embodiment of a tele-communication system.

Turning to FIG. 8, a block diagram of a tele-communi-cation system is depicted. As illustrated, tele-communication system 800 includes computer system 801, call originator 802, and call recipient 803. It is noted that telecommunication system 800 may, in various embodiments, include additional elements, e.g., switches, relays, satellites, etc., which have been omitted for clarity.

In various embodiments, call originator 802 can initiate call 805 to call recipient 803, which may be an audio call, video call, tele-conference, or virtual meeting. In some cases, call originator 802 may attempt to hide their identity by using an artificial-intelligence engine to generate audio and visual information for call 805. In order to prevent misuse, the artificial-intelligence engine may be configured to encode audio embedded information 806 and video embedded information 807 into call 805 using one or more of the techniques described above. In some embodiments, only one type of embedded information may be employed.

Computer system 801 is configured to monitor call 805. In various embodiments, computer system 801 may be further configured to analyze data packets associated with call 805 to check for embedded information, such as audio embedded information 806 and video embedded information 807. In cases where call 805 is encrypted, computer system 801 may be further configured to decrypt call 805 as part of checking for embedded information.

In response to a detection of either, or both, of audio embedded information 806 or video embedded information 807, computer system 801 is configured to send notification 804 to call recipient 803 informing call recipient 803 that call 805 is computer generated and that caution should be exercised in revealing personal or financial information. In other embodiments, computer system 801 may be further configured to send notification 804 to one or more additional devices or persons associated with call recipient 803. For example, in some cases, computer system 801 may be configured to send notification 804 to an emergency contact of call recipient 803, a person with power of attorney for call recipient, a spouse of call recipient 803, and the like. Notification 804 may, in some embodiments, be displayed on a screen of user equipment associated with call recipient 803. In other embodiments, computer system 801 may be configured to terminate call 805 in response to the detection of embedded information. In other embodiments, computer system 801 may be configured to disable a microphone and/or speaker on user equipment associated with call recipient 803 in response to the detection of embedded information. In some embodiments, computer system 801 may be configured, in response to the detection of embedded information, to save a copy of call 805 for further analysis.

Figure 9:
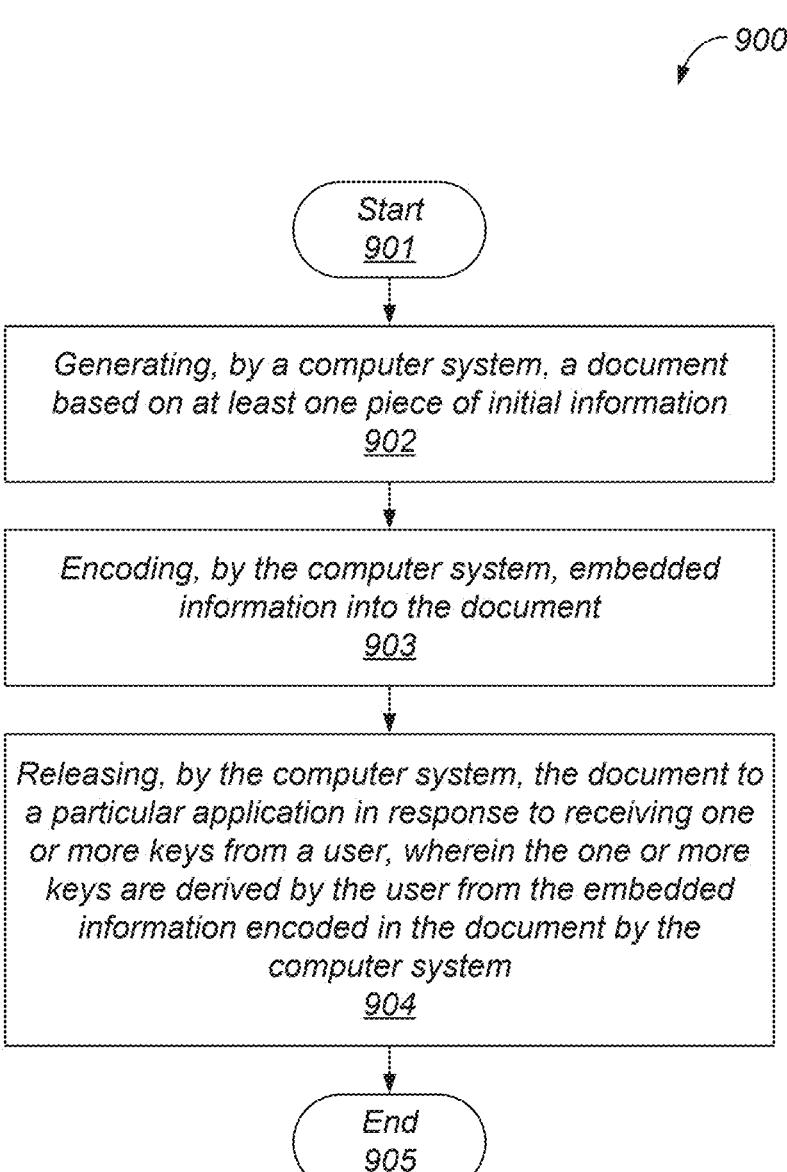
FIG. 9 depicts a flow diagram illustrating an embodiment of a method for using generated embedded information in a document.

Turning to FIG. 9, a flow diagram illustrating an embodiment of Method 900 for using generated embedded information in a document is depicted. Method 900, which may be applied to various system architectures, e.g., system architecture 100 as depicted in FIG. 1, begins in block 901.

Method 900 includes generating, by a computer system, a document based on at least one piece of initial information (block 902). In some embodiments, the method may also include using, by the computer system, at least one machine-learning model and at the at least one piece of initial information, to generate the document. In some cases, using the at least one machine-learning model may include executing, by the computer system, software or program instructions that include at least one artificial-intelligence algorithm.

Method 900 further includes encoding, by the computer system, embedded information into the document (block 903). In various embodiments, encoding the embedded information into the document includes inserting one or more portions of the embedded information into one or more random locations of a plurality of random locations in the document. In some embodiments, Method 900 also includes using, by the computer system, at least one portion of the document to generate the embedded information. In such cases, using the at least one portion of the document to generate the embedded information includes using, by the computer system, the at least one portion of the document to determine at least one random value.

Method 900 also includes releasing, by the computer system, the document to a particular application in response to receiving one or more keys from a user (block 904). In various embodiments, the one or more keys are derived by the user from the embedded information encoded in the document by the computer system. In other embodiments, releasing, by the computer system, the document to the particular application includes removing, by the computer system, the embedded information.

Figure 10:
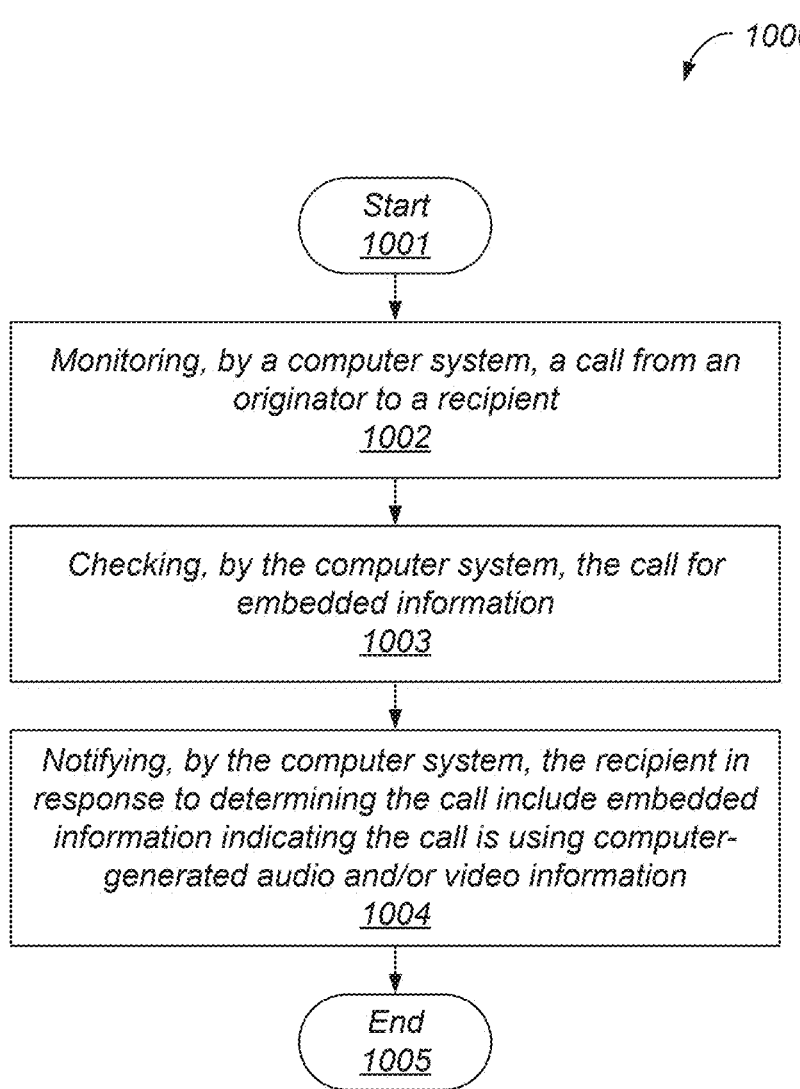
FIG. 10 depicts a flow diagram illustrating an embodiment of a method for monitoring call data for embedded information.

Turning to FIG. 10, a flow diagram depicting an embodiment of method 1000 for monitoring call data for embedded information is illustrated. Method 1000, which may be applied to various telecommunication systems, e.g., telecommunication system 800 as depicted in FIG. 8, begins in block 1001.

Method 1000 includes monitoring, by a computer system, a call from an originator to a recipient (block 1002). In various embodiments, monitoring the call may include receiving a copy of packets of data sent by user equipment associated with the originator of the call. The packets may include encrypted audio and/or video information.

Method 1000 also includes checking, by the computer system, the call for embedded information (block 1003). In some cases, checking the call for embedded information includes decrypting the data packets, and checking one or more of the data packets for embedded audio information and embedded video information.

Method 1000 further includes notifying, by the computer system, the recipient in response to determining that the call includes embedded information indicating the call is using computer-generated audio and/or video information (block 1004). In various embodiments, notifying the recipient or recipient's representative includes displaying a message on user equipment associated with the recipient or recipient representative. It is noted that, in different embodiments, the message may be hidden from the originator, while in other embodiments, the message may be displayed on user equipment associated with the originator.

In some embodiments, method 1000 may further include disconnecting, by the computer system, the call from the recipient's user equipment in response to displaying the message. In other embodiments, the message may include an option for the recipient to save a transcript of the call, as well as other information associated with the call, e.g., the detected embedded information. Method 1000 concludes in block 1005.

None of the descriptions in this application should be read as implying that any particular element, step, or function is an essential element that must be included in the claim scope. The scope of patented subject matter is defined only by the claims. Moreover, none of the claims are intended to invoke 35 U.S.C. § 112(f) unless the exact words "means for" are followed by a participle.

What is claimed is:

1. A method, comprising:
   generating, by a computer system, a document based on at least one piece of initial information and at least one machine-learning model;

encoding, by the computer system, embedded information into the document, wherein the embedded information is embedded into the document, by the computer system, in one or more portions of the document;

using, by the computer system, text in the document as seed for generating random values to be used as at least part of the embedded information;

releasing, by the computer system, the document to an application in response to receiving one or more keys from a user, wherein the one or more keys are derived by the user from the embedded information encoded in the document by the computer system; and imposing, by the computer system, a review strength upon the user, wherein the review strength imposed upon the user is based on a number of portions of the embedded information within the document, and wherein the review strength comprises imposing a review by the user on the number of portions of the embedded information within the document.

2. The method of claim 1, wherein encoding the embedded information into the document includes inserting one or more portions of the embedded information into one or more random locations of a plurality of random locations in the document.

3. The method of claim 1, further comprising: in response to verifying the one or more keys received from the user, removing, by the computer system, the embedded information from the document.

4. The method of claim 1, further comprising: using, by the computer system, at least one portion of the document to generate the embedded information.

5. The method of claim 4, wherein using the at least one portion of the document includes: using, by the computer system, the at least one portion of the document to determine a random value.

6. A non-transitory computer-accessible storage medium having program instructions stored therein that, in response to execution by a computer system being implemented by a processor, cause the computer system to perform operations including:

generating a document based on at least one piece of initial information and at least one machine-learning model;

encoding embedded information into the document, wherein the embedded information is embedded into the document, by the computer system, in one or more portions of the document;

using text in the document as seed for generating random values to be used as at least part of the embedded information;

releasing the document to an application in response to receiving one or more keys from a user, wherein the one or more keys are derived by the user from the embedded information encoded in the document by the computer system; and imposing a review strength upon the user, wherein the review strength imposed upon the user is based on a number of portions of the embedded information within the document, and wherein the review strength comprises imposing a review by the user on the number of portions of the embedded information within the document.

7. The non-transitory computer-accessible storage medium of claim 6, wherein encoding the embedded information into the document includes inserting one or more portions of the embedded information into one or more random locations of a plurality of random locations in the document.

8. The non-transitory computer-accessible storage medium of claim 6, further comprising: in response to verifying the one or more keys received from the user, removing, by the computer system, the embedded information from the document.

9. The non-transitory computer-accessible storage medium of claim 6, further comprising: using, by the computer system, at least one portion of the document to generate the embedded information.

10. The non-transitory computer-accessible storage medium of claim 9, wherein using the at least one portion of the document includes: using, by the computer system, the at least one portion of the document to determine a random value.

11. The non-transitory computer-accessible storage medium of claim 6, wherein the application includes an electronic mail application.

12. A system, comprising:

one or more memory circuits configured to store instructions; and one or more processor circuits configured to receive the instructions from the one or more memory circuits and execute the instructions to cause the system to perform operations including:

generating a document based on at least one piece of initial information and at least one machine-learning model;

encoding embedded information into the document, wherein the embedded information is embedded into the document, by the system, in one or more portions of the document;

using text in the document as seed for generating random values to be used as at least part of the embedded information;

releasing the document to an application in response to receiving one or more keys from a user, wherein the one or more keys are derived by the user from the embedded information encoded in the document by the computer system; and imposing a review strength upon the user, wherein the review strength imposed upon the user is based on a number of portions of the embedded information within the document and wherein the review strength comprises imposing a review by the user on the number of portions of the embedded information within the document.

13. The system of claim 12, wherein encoding the embedded information into the document includes inserting one or more portions of the embedded information into one or more random locations of a plurality of random locations in the document.

14. The system of claim 12, wherein the operations further include, in response to verifying the one or more keys received from the user, removing, by the computer system, the embedded information from the document.

15. The system of claim 12, further comprising: using, by the computer system, at least one portion of the document to generate the embedded information.

16. The system of claim 15, wherein using the at least one portion of the document includes: using, by the computer system, the at least one portion of the document to determine a random value.

17. The system of claim 12, wherein the application includes an electronic mail application.

* * * * *